United States Patent
Brown

[19]

[11] Patent Number: 5,940,038
[45] Date of Patent: *Aug. 17, 1999

[54] RADIO TELEPHONE

[75] Inventor: Andrew P. Brown, Bracknell, United Kingdom

[73] Assignee: Nokia Mobile Phones Limited, Salo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/538,388

[22] Filed: Oct. 3, 1995

[30] Foreign Application Priority Data

Dec. 15, 1994 [GB] United Kingdom .................. 9425359

[51] Int. Cl.⁶ ....................................................... H01Q 1/24
[52] U.S. Cl. ......................... 343/702; 343/895; 343/906
[58] Field of Search .................................. 343/702, 895, 343/900, 901, 906; 455/89, 90; H01Q 1/24

[56] References Cited

U.S. PATENT DOCUMENTS

| | | | |
|---|---|---|---|
| 4,868,576 | 9/1989 | Johnson, Jr. ............................ | 343/702 |
| 5,255,001 | 10/1993 | Tamura et al. ........................... | 343/702 |
| 5,343,213 | 8/1994 | Kottke et al. ............................ | 343/702 |
| 5,504,494 | 4/1996 | Chatzipetros et al. .................. | 343/702 |
| 5,532,703 | 7/1996 | Stephens et al. ........................ | 343/702 |
| 5,535,439 | 7/1996 | Katz ........................................ | 455/117 |

FOREIGN PATENT DOCUMENTS 2266997  11/1993  United Kingdom .

*Primary Examiner*—Hoanganh Le
*Attorney, Agent, or Firm*—Perman & Green, LLP

[57] ABSTRACT

A radio telephone, which may be a mobile telephone, a cordless telephone or similar, has an outer housing, a fixed antenna mounted substantially within the housing and a cooperating external antenna. The external antenna is arranged to be brought into cooperating proximity to the fixed antenna, such that the telephone communicates via a capacitive coupling between the fixed antenna and the external antenna. The external antenna may be supported within a desk support for the telephone, including hands free operating devices and charging devices. Alternatively, the external antenna may clip onto a protruding section of the internal antenna.

14 Claims, 3 Drawing Sheets

RADIO TELEPHONE

FIELD OF INVENTION

The present invention relates to radio telephones having an outer housing and an internal antenna contained substantially within said housing.

BACKGROUND TO INVENTION

Radio telephones are known in which a fixed helical antenna is provided to allow radio communication with a base station. The antenna may be contained totally within the housing of the radio telephone, such that no external antenna protrudes from said housing. Alternatively, part of the antenna may extend from the housing.

Recently, radio telephones of this type have taken two distinct forms. Some radio telephones communicate with an associated telephone, usually connected to the public switch telephone network (PSTN). Radio telephones of this type operate in a similar manner to conventional telephones, however they may be operated from a handset which does not require a cord connecting it to the remainder of the telephone base station. Telephones of this type are commonly referred to as "cordless" telephones and from a Network Operator's point of view, they are perceived as conventionally configured telephones.

In addition, radio telephones are provided which operate within cellular networks and the radio link from the telephone to a base station is part of the telecommunications network. Usually, the radio portion of the telecommunications network is established by a plurality of base stations and radio telephones of this type would communicate with whichever base station provided the strongest signal. Furthermore, switching between base stations may occur as the telephone moves over a geographical area. Radio telephones of this type are commonly referred to as "mobile" telephones, a term which is often used to distinguish them from the previously defined "cordless" telephones. As used herein, the term "radio telephone" is intended to relate to both the "mobile" and "cordless" type telephones previously defined, along with more conventional radio telephone type communicators, which are only arranged to communicate directly with similar devices, and non-cellular mobile telephones.

In order to improve communication, particularly in mobile telephones, it is common for a helical antenna to extend beyond the housing of a radio telephone and for a retractable whip antenna to be extended from said housing when improved communication is required. An antenna for a portable cellular telephone is disclosed in U.S. Pat. No. 4,868,576 and comprises a helical coil extending from an outer housing of the telephone. In addition, a half wavelength whip antenna may be extended from within the housing such that, when so extended, it is capacitively coupled to the helical coil.

A problem with this arrangement is that the mobile telephone itself must be arranged such as to accept the extendable whip antenna when pushed into its retracted position. Thus, in many situations where the whip antenna is never required, it must still be accommodated within the device, thereby adding unnecessarily to the complexity and expense of the overall telephone.

It is envisaged that in future mobile communications will become widespread and that as network facilities increase, it will be desirable to reduce the complexity and expense of radio telephones. Consequently, it would be undesirable in many environments to construct telephones with retractable whip antennas, particularly if the telephones are designed to operate under conditions in which such antennas would rarely be required.

Cordless telephones are known in which rugged telescopic aerials may be extended from a housing when the telephone is in operation. In these known cordless telephones, the telephone itself usually sits on a support base that, provides recharge power for batteries and it is unusual for the telephone to be carried by a user when not in use. Furthermore, in the majority of cordless environments, the range of telephones is clearly restricted.

In the future, it is likely that cordless telephones, like mobile telephones, will operate in accordance with digital transmission standards. This will allow the telephones to operate over wider ranges and, in addition, allow them to operate in more sophisticated operating environments, such that a single cordless telephone may be capable of operating from a plurality of base stations. Thus, although it is unlikely that cordless telephones will develop to be as complex as mobile telephones, the tendency is towards telephones of this type becoming more portable, therefore it is undesirable for them to provided with cumbersome antenna arrangements.

Mobile telephones are known in which an antenna is physically attached to the mobile telephone when required. The antenna itself is threaded and thereby engages within a tapped hole within the mobile telephone housing such that, once so engaged, an electrical connection is provided between the telephone duplexor and the aerial itself, effectively by-passing internal or external helical antennas. A problem with such arrangements is that the telephone housing itself must be configured so as to receive such an antenna, which generally results in each particular telephone type only co-operating with a particular antenna type. A further disadvantage is that effort is required on the part of the user to configure the telephone for operation with or without its extended antenna. Under these circumstances, it is common for the telephone to be used permanently without its antenna or for its antenna to be permanently in position. Consequently, an operator runs the risk of the telephone operating incorrectly, without the antenna in place, or, alternatively, the telephone may be unnecessarily cumbersome, with the antenna in position in situations where it is not actually required.

Arrangements are also known in which a telephone co-operates with an antenna without the antenna being brought into physical contact with the telephone itself. In cars and other vehicles, it is possible to provided an externally mounted antenna which is electrically connected to an internal antenna. The internal antenna effectively re-radiates the received signal. Thus, in these circumstances, there is no electrical or capacitive coupling between the re-radiating antenna and the internal antenna of the telephone. The external antenna, as far as the telephone is concerned, is effectively the re-radiating antenna that re-radiates electromagnetic radiation to the telephone's antenna.

A problem with such an arrangement is that a user has no control over the relationship between the car mounted antenna and the telephone mounted antenna. Furthermore, being mounted to a car, the antenna is of little benefit in other situations, unless a plurality of antennas are assembled for operation at positions where an operator is usually required to make telephone calls. Under these circumstances, of course, the advantages of radio telephones is somewhat mitigated, in that conventional land based telephones could also be provided at these positions.

SUMMARY OF INVENTION

According to a first aspect of the present invention, there is provided a radio telephone having an outer housing, a fixed antenna mounted substantially within said housing and a cooperating external antenna, wherein said external antenna is arranged to be brought into operating proximity to the fixed antenna, such that the telephone communicates via a non-contacting coupling between the fixed antenna and the external antenna.

Thus, the advantage of the present invention is that a first antenna is internally mounted within the telephone housing. In addition, an external antenna is provided which may be non-contactively coupled to said internal antenna while remaining removable from said telephone housing.

In a preferred embodiment the non-contacting coupling may be a capacitive coupling.

Preferably, the external antenna may be attached, possibly by a resilient clipping mechanism.

In a alternative preferred embodiment, the non-contacting coupled external antenna is supported by a telephone mounting device. The telephone housing is arranged to be supported by said mounting device such that, when so supported, the external antenna is non-contactively coupled to the internal antenna. Preferably, the non-contacting coupling is a capacitive coupling. Advantageously, the supporting device also facilitates hands free operation of the radio telephone.

The invention will now be described by way of example only, with reference to the accompanying Figures.

Figure 1:
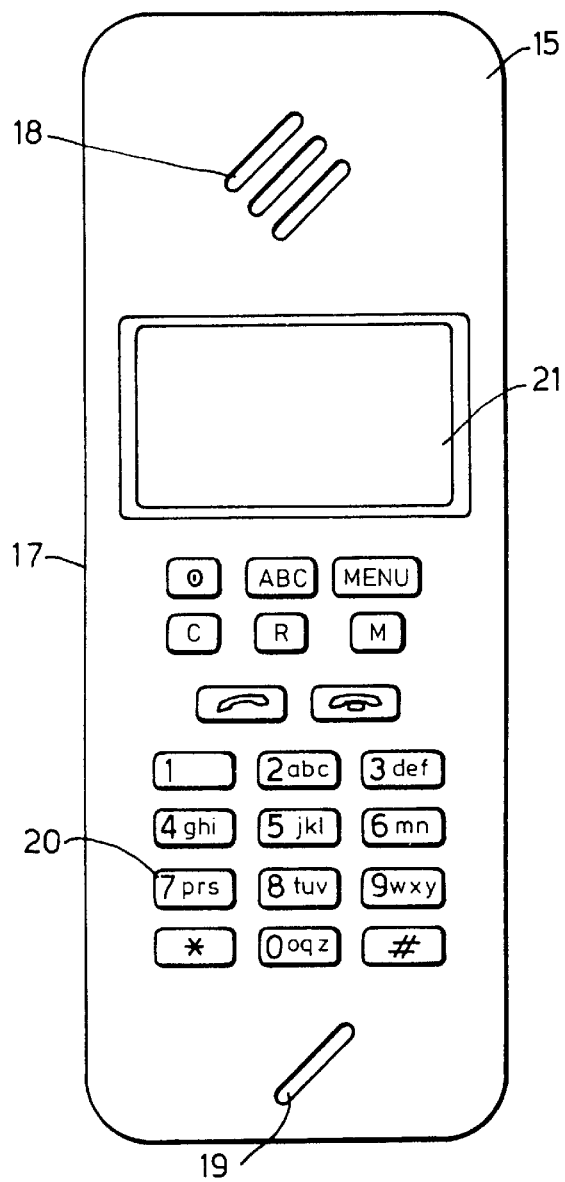
FIG. 1 shows a mobile telephone having an internal antenna.

A portable cellular telephone housing is shown in FIG. 1, having a front face 15, a first side face 16 and a second side face 17. A front face 15 includes openings 18 behind which a loudspeaker is mounted and an opening 19 behind which a microphone is mounted, thereby allowing the front face of the telephone to be brought into operating proximity with a mouth and ear of a user.

Keys 20 are provided on the front face 15 which are arranged so as to present a plurality of keys in the form of a key pad to an operator. The keys are used for entering alpha numeric data and for selecting particular operating functions. The telephone includes an antenna to facilitate communication between the telephone and base stations.

Figure 2:
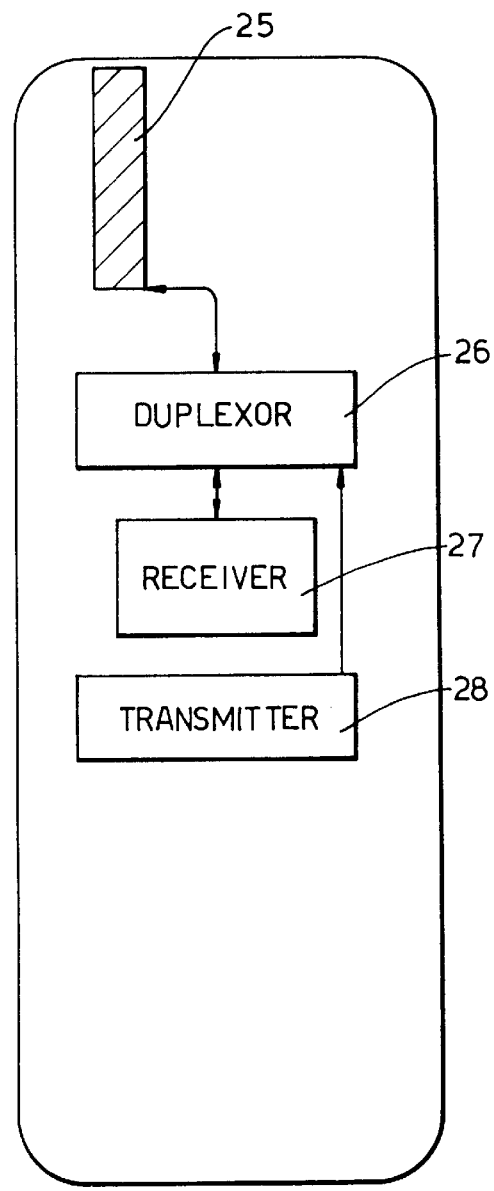
FIG. 2 is a diagrammatic cross section of the telephone shown in FIG. 1, showing the internal helical antenna connected to the communication circuitry.

A cross section of the telephone shown in FIG. 1 is shown in FIG. 2. An antenna 25 is a spiral wound half wavelength antenna. The antenna 25 is arranged to communicate with a duplexor 26, which in turn supplies signals to a receiver 27 and receives signals from a transmitter 28.

The internal helical antenna 25 is totally inclosed within the housing shown in FIG. 2 and no mechanical means are provided for allowing an additional external antenna to be connected to the housing. In addition, there is no electrical contact to facilitate connection of antenna 25 or the duplexor 26 to an external antenna, such as that provided by hands free car kits etc. However, it is appreciated that in some circumstances it would be desirable to provide enhanced radio communication by improving the gain of the antenna. In order to achieve this, an external antenna is arranged to be brought into operating proximity to the fixed antenna 25 such that the telephone communicates via a capacitive coupling between the fixed antenna 25 and a suitably arranged external antenna.

Figure 3:
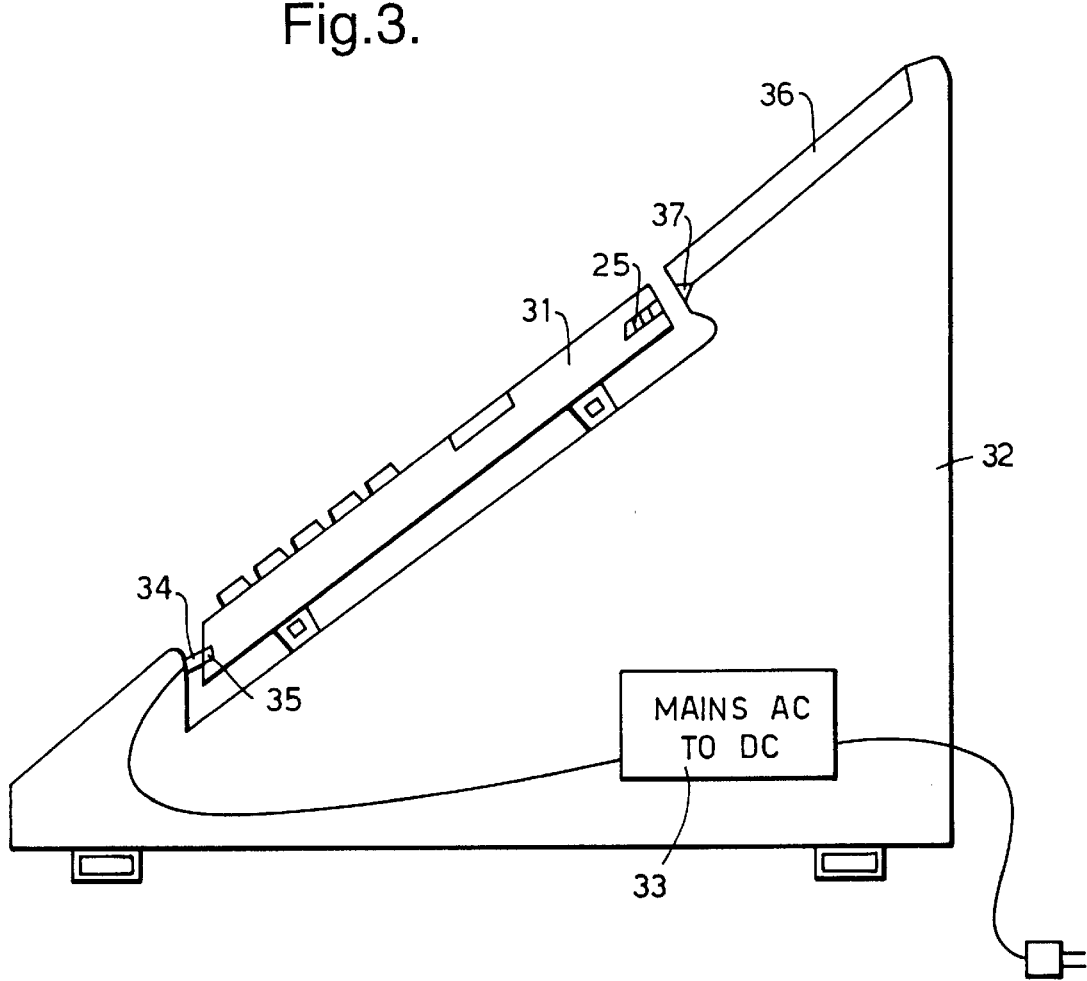
FIG. 3 shows the telephone of FIG. 1 supported within a base stand, arranged to support an external antenna.

An arrangement for allowing the internal antenna 25 to co-operate with a capacitively coupled external antenna is shown in FIG. 3. The telephone, identified by numeral 31, is supported by a desk mountable base stand 32. The base stand includes a transformer 33 for converting alternating current mains supply into a dc supply of suitable voltage for powering the telephone 31. The power from the transformer 33 is supplied to the telephone 31 via a suitably arranged contact 34 which contacts similarly arranged contacts 35 in the base of the telephone.

The base stand 32 includes an externally mounted monopole antenna 36. The monopole antenna is arranged such that a base portion of said antenna 37 is brought into close proximity with the telephone's internal antenna 25. Thus, at operating frequencies, a capacitive coupling is provided between the telephone's internal antenna 25 and the base stand's antenna 36. In this way, communication characteristics of the telephone 31 are improved when the telephone is placed within its base stand. In addition, devices may also be provided, such as a loudspeaker and a microphone, in order to allow hands free operation of the telephone while retained within its base stand 32. Thus, in this way, a telephone may be used in hands free mode, while taking advantage of the enhanced communication characteristic of the additional antenna 36. However, when the telephone is removed from the base stand 33, there is no need to disconnect antenna connectors or to make any other modification to the arrangement of the device. Thus, full advantage may be taken of the additional antenna 36 without requiring additional operations to be performed on the part of the user.

Figure 4:
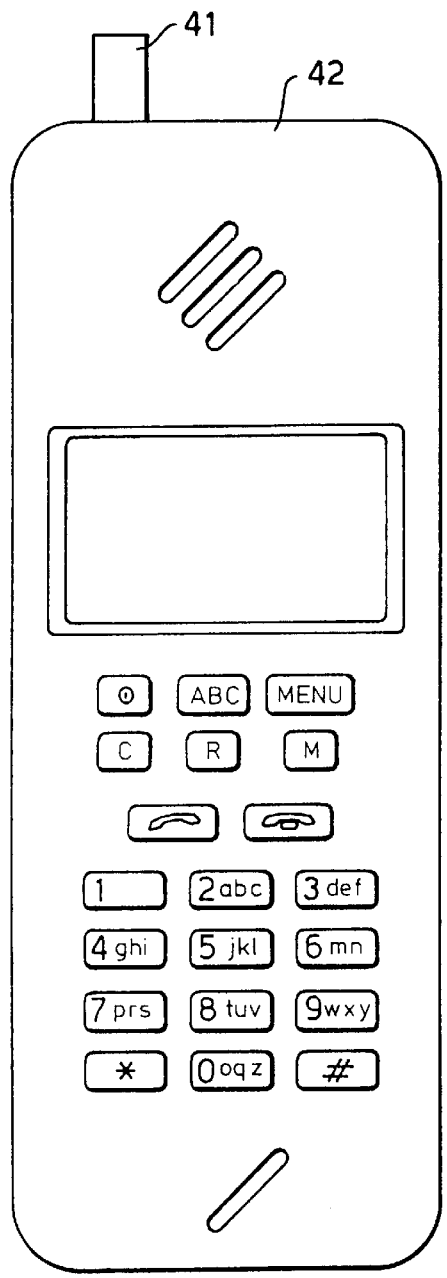
FIG. 4 shows an alternative mobile telephone having part of its fixed helical antenna protruding from the telephone housing.

A telephone similar to that shown in FIG. 1 is shown in FIG. 4, in which a section 41 of an internal helical antenna protrudes beyond a housing 42 of the telephone. In normal operation, communication is facilitated with base stations via the helical antenna although, in some situations, signal strength may be less than ideal.

Figure 5:
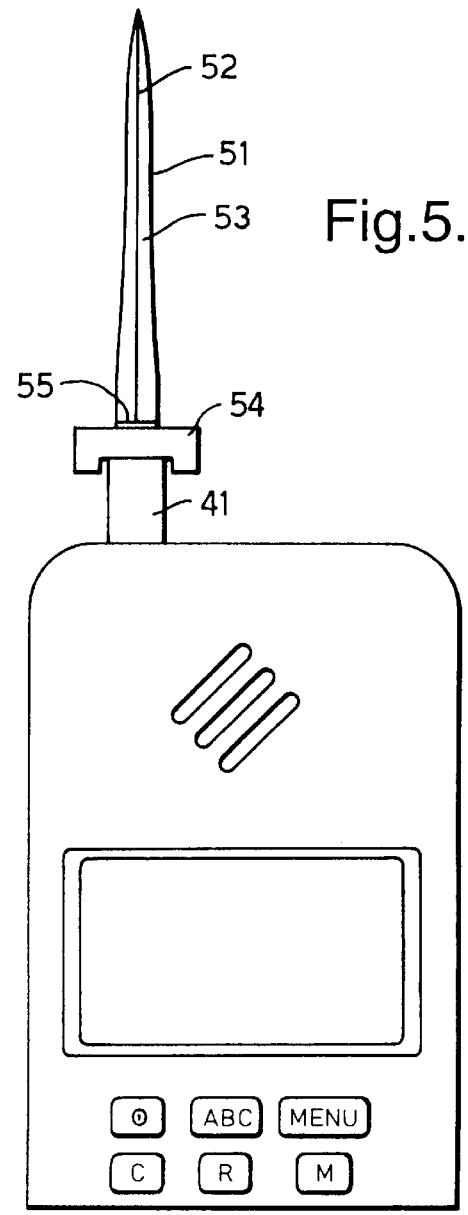
FIG. 5 shows an external antenna arranged to clip onto the protruding section shown in FIG. 4.

An arrangement for improving transmission characteristics for the telephone shown in FIG. 4 is illustrated in FIG. 5. An external antenna 51 is arranged to be brought into operating proximity to the fixed antenna by being clipped onto the protruding section 41. The external antenna includes a half wavelength radiating monopole defined by a flexible wire 52. The flexible wire is surrounded by a plastic moulding 53 which, at its base, defines a clip 54 arranged to fit around and thereby clip over said protruding section 41.

The flexible wire is connected, at its base, to a conducting plate 55, which in turn capacitively couples the external antenna to the internal helical antenna of the telephone. Thus, although no direct electrical communication is provided between the external antenna 51 and the internal antenna, a capacitive coupling is provided, such as to enhance the operation of the internal antenna. Furthermore, modification to the telephone and to its internal antenna in order to allow enhanced communication to be achieved, is minimal. It is not necessary to provide mechanisms under which the additional antenna may be retracted within the housing. The external antenna could be carried separately and only clipped into place when required. Furthermore, the clipping operation is very straightforward and no additional mechanisms are required in order for the external antenna to be supported. Furthermore, given that the external antenna does not provide a direct electrical connection to a duplexor, it is not necessary for the telephone to effect switching operations, so as to take account of the additional antenna.

The external antenna shown in FIG. 5 is a half wave length monopole antenna, consisting of a straight flexible wire. When operating at typical frequencies, this external antenna may have a length of approximately 8 cm. The length of the external antenna may be reduced by configuring the antenna in the form of a half wavelength helical antenna, in which the electrical conductor forms a spiral, supported within a plastic moulding. Additionally, such an external antenna could be clipped to the housing of a radio telephone and in operating proximity to an antenna wholly enclosed within the housing.

The external antennas shown in FIG. 3 and FIG. 5 have been described with reference to cellular mobile telephones. However, similar devices may be used in any communicating device in which a radio connection is required. For example, the devices may be used in non-cellular mobile telephones or in cordless telephones. Additionally, the coupling may be some other form of non-contacting coupling such as inductive coupling.

What I claim is:

1. A radio telephone having an outer housing, a fixed antenna mounted substantially within said housing and a cooperating external antenna, arranging means provided between said fixed antenna and said external antenna for selectively nonconductively spacing said fixed antenna from said external antenna; said external antenna is arranged by said arranging means so as to be brought into operating proximity to the fixed antenna, such that the telephone communicates via a non-contacting coupling between the fixed antenna and the external antenna and wherein the cooperating external antenna is permanently located externally of the outer housing of the radio telephone, and wherein said external antenna is readily separable from said radio telephone such that one is movable with respect to the other and that the external antenna when moved to a one position away from the radio telephone corresponding where said external antenna is positioned beyond said non-contacting coupling to effect a not-in-use non-operative condition in relation to the radio telephone, and wherein said external antenna and said radio telephone are movable with respect to the other to a second position such that the external antenna is located next to the radio telephone corresponding to being within said non-contacting coupling and said second position being an in-use operative condition in relation to the radio telephone.

2. A telephone according to claim 1, wherein the non-contacting coupling is capacitive coupling.

3. A telephone according to claim 1, wherein the fixed antenna is arranged to be brought into operating proximity with said external antenna by being placed within a supporting means, wherein said external antenna is also supported by said supporting means.

4. A telephone according to claim 3, wherein said external antenna is housed totally within said supporting means.

5. A telephone according to claim 3, wherein said supporting means includes means for providing power to the telephone.

6. A telephone according to claim 3, wherein the supporting means facilitates hands free operation of the telephone.

7. A telephone according to claim 1, wherein the fixed antenna has a protruding section which protrudes partially from the telephone housing.

8. A telephone according to claim 7, wherein said external antenna is arranged to mechanically co-operate with said protruding section.

9. A telephone according to claim 8, wherein said external antenna is arranged mechanically co-operate via an interference clipping means arranged to clip over a part of said protruding section.

10. A telephone according to claim 1, wherein said fixed antenna is a helical antenna.

11. A telephone according to claim 1, wherein said external antenna is a half wavelength helical antenna.

12. A telephone according to claim 1, wherein said external antenna is a half wavelength monopole antenna.

13. A radio telephone having an outer housing, a fixed antenna mounted substantially within said housing as defined by an outer end thereof and a cooperating external antenna, wherein said external antenna is arranged to be brought into operating proximity to the fixed antenna, such that the telephone communicates via a non-contacting coupling between the fixed antenna and the external antenna and wherein the cooperating external antenna is permanently located externally of the outer housing of the radio telephone and said operating proximity creates a nonconductive space between the outer end of the fixed antenna and the external antenna which is free of any RF conducting material, said space is selected such that it provides a capacitive coupling between said external antenna and said fixed antenna, and wherein said external antenna is readily separable from said radio telephone such that one is movable with respect to the other and that the external antenna when moved to a one position away from the radio telephone corresponding where said external antenna is positioned beyond said capacitive coupling to effect a not-in-use non-operative condition in relation to the radio telephone, and wherein said external antenna and said radio telephone are movable with respect to the other to a second position such that the external antenna is located next to the radio telephone corresponding to being within said capacitive coupling and said second position being an in-use operative condition in relation to the radio telephone.

14. A method of enhancing radio communication in a portable cellular telephone comprising the steps of:

providing said telephone with a housing and an internal antenna totally enclosed therewithin;

providing an external antenna capable of being arranged in close proximity to said internal antenna on said housing;

selectively arranging said external antenna in close proximity to said housing such that a nonelectrically conductive spacing exists between said internal antenna and said external antenna, and so arranging said external antenna relative to said internal antenna so as to communicate through said spacing by a capacitive coupling in circumstances where it is desirable to provide enhanced radio communication; and providing said external antenna as a readily separable element from said telephone such that one is movable with respect to the other and that the external antenna when moved to a one position away from the telephone corresponding where said external antenna is positioned beyond said capacitive coupling to effect a not-in-use non-operative condition in relation to the telephone, and wherein said external antenna and said telephone are movable with respect to the other to a second position such that the external antenna is located next to the telephone corresponding to being within said capacitive coupling and said second position being an in-use operative condition in relation to the telephone.

* * * * *